June 8, 1965  C. J. GANTZER  3,187,868
POWER TRANSMISSION MECHANISM
Filed May 31, 1961  2 Sheets-Sheet 2
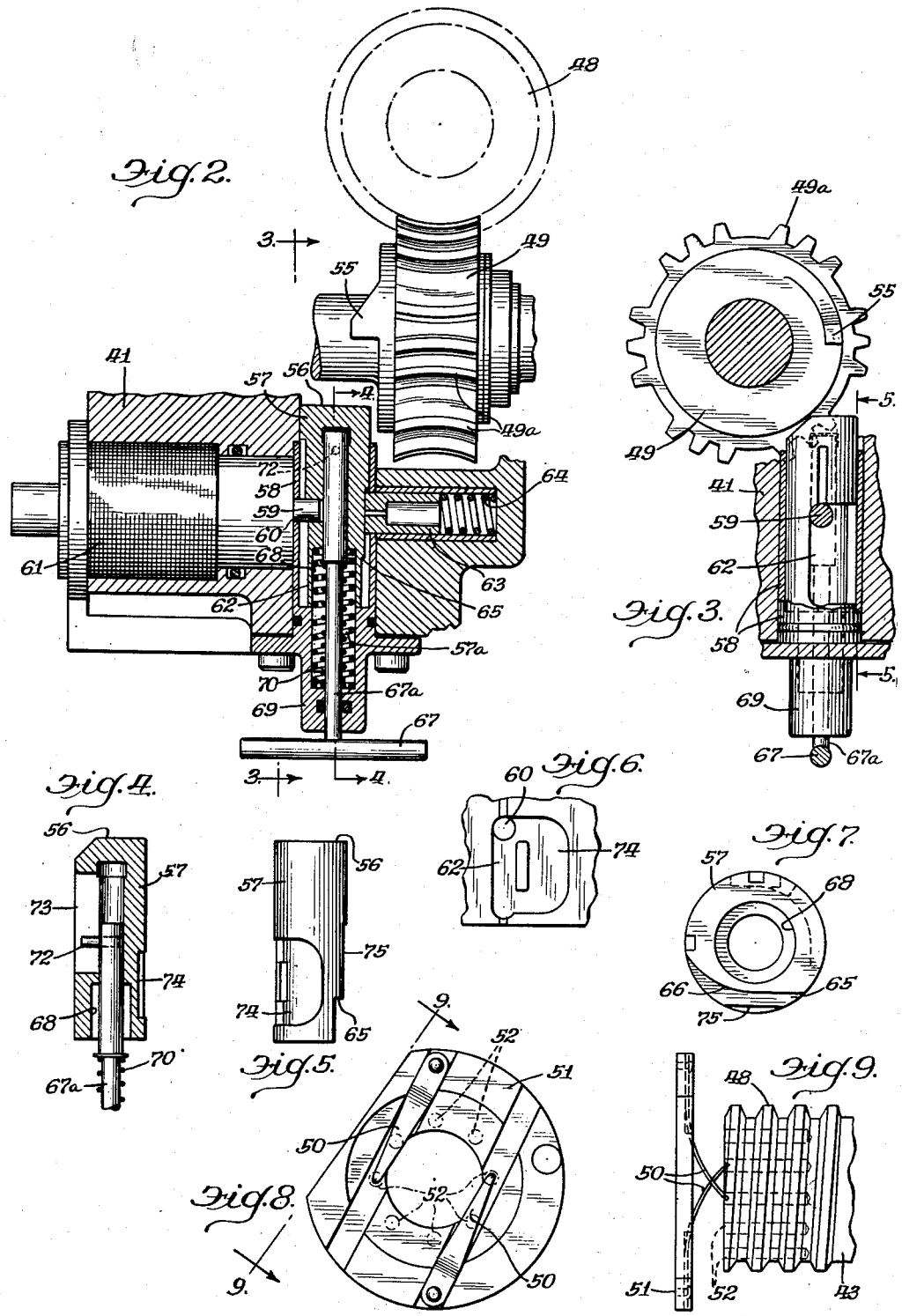

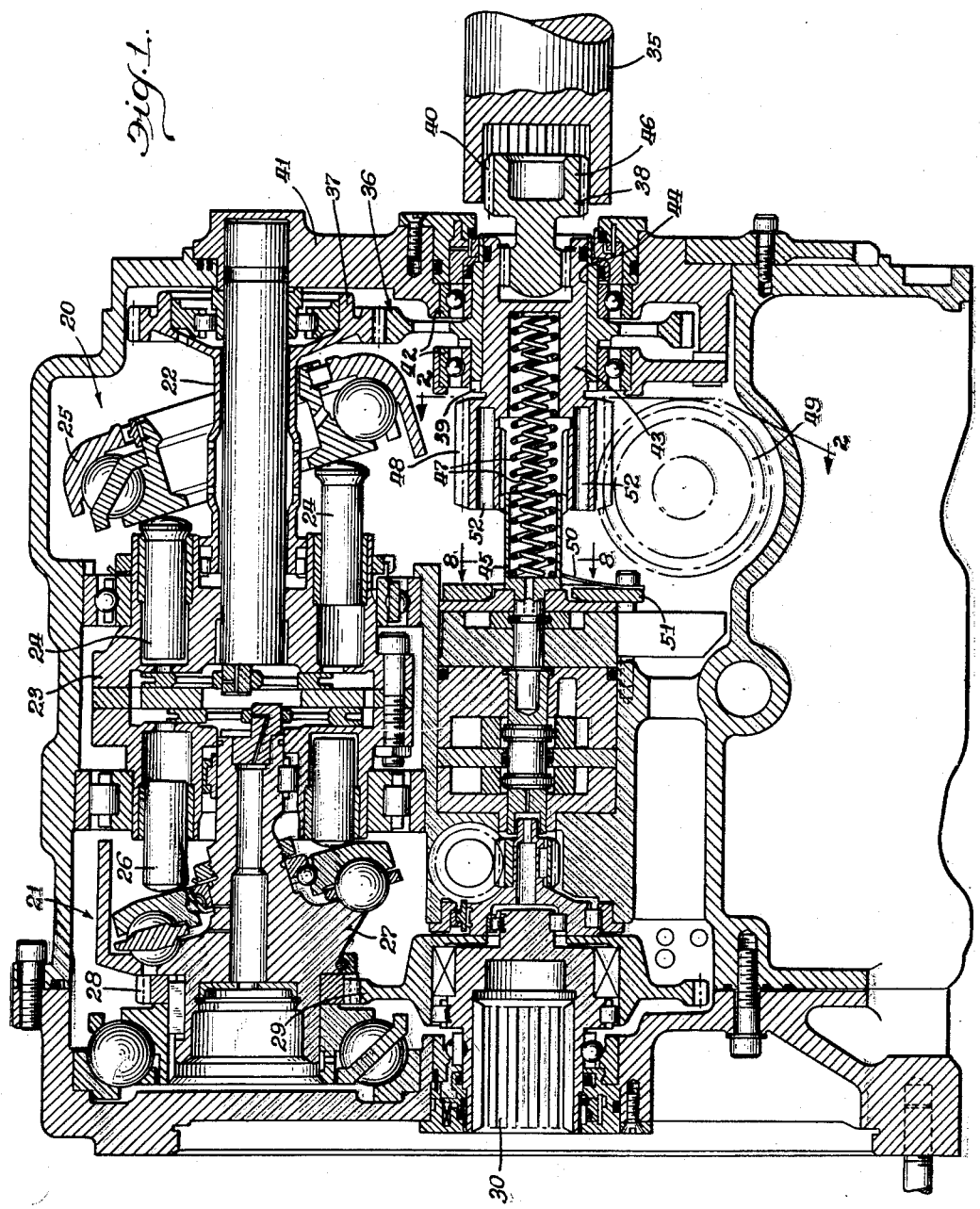

United States Patent Office 3,187,868
Patented June 8, 1965

3,187,868
POWER TRANSMISSION MECHANISM
Charles J. Gantzer, Rockford, Ill., assignor to Sundstrand Corporation, a corporation of Illinois
Filed May 31, 1961, Ser. No. 113,699
13 Claims. (Cl. 192—101)

This invention relates to a power transmission mechanism, and more particulularly to a quick disconnect clutch for uncoupling a driving member from a driven member.

It is a general object of this invention to provide a new and improved quick disconnect clutch in a power transmission mechanism.

Another object of this invention is to provide a new and improved disconnect device utilizing driving input power for disengaging a driving member from a driven member.

Still another object is to provide a new and improved disconnect device for uncoupling a driving member and a driven member at any speed other than zero, i.e., within normal limits of operation.

A more specific object of the invention is to provide a new and improved clutch device requiring only a relatively small actuation force for effecting disengagement of a driving member from a driven member and selectively operable to couple the driving and driven member, and aside from the driving member there being no running parts when the driving and driven members are disengaged.

Although the invention is applicable to numerous environments requiring a quick disconnect device, in the preferred embodiment illustrated herein, the invention is disclosed in connection with a hydraulic transmission including a pump for operating a motor which drives an output shaft, with an input shaft connected with the pump through the disconnect device.

According to the preferred embodiment, the quick disconnect clutch includes a rotatable and axially slidable coupler. This coupler is detachably connected with a driving member, here in the form of a rotating input shaft, by a driving connector illustrated as a telescopically detachable splined connection between one end of the coupler and the driving member. A driven member, here in the form of a gear concentric with the coupler and connected for driving the pump, is driven by the coupler through a disengageable driven connector in the form of cooperating clutch teeth on the coupler and driven member. The driven connector is arranged to be disconnected before the driving connector and to be engaged after the driving connector for smoother operation and to minimize the possibility of damage to the input shaft. Engagement and disengagement of the driving and driven connector are effected through a worm gear, including a worm concentrically rotatable with the coupler and a worm wheel freely rotatable about an axis transverse to the rotational axis of the coupler, arranged so that by stopping rotation of the worm wheel the worm threads itself axially through the worm wheel to move the coupler and disengage the driving and driven connectors. Upon releasing the worm wheel for rotation the worm is threaded back through the worm wheel to again engage the driving and driven connectors. A solenoid controlled mechanism is provided for controlling disengagement of the driving and driven connectors, and the quick disconnect device may be utilized either as an emergency measure or as part of a planned program.

Other objects and advantages will become readily apparent from the following detailed description taken in connection with the accompanying drawings, in which:

FIGURE 1 is a longitudinal, partially broken, sectional view through a hydraulic transmission including a power transmission mechanism embodying principles of the invention;

FIGURE 2 is a fragmentary, enlarged sectional view taken generally along the line 2—2 of FIGURE 1;

FIGURE 3 is a fragmentary sectional view taken generally along the line 3—3 of FIGURE 2;

FIGURE 4 is a longitudinal, partially broken, sectional view of a plunger assembly, taken generally along the line 4—4 of FIGURE 2;

FIGURE 5 is an elevational view of the plunger, taken generally as illustrated along the line 5—5 of FIGURE 3;

FIGURE 6 is a fragmentary, developed elevational view of a cam portion in the side of the stop plunger illustrated in FIGURE 5;

FIGURE 7 is a bottom view of the stop plunger;

FIGURE 8 is an enlarged sectional elevational view taken generally along the line 8—8 of FIGURE 1; and, FIGURE 9 is a fragmentary, enlarged elevational view taken generally along the line 9—9 of FIGURE 8.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring to the drawings, in FIGURE 1 a preferred embodiment of the invention is illustrated in connection with a hydraulic transmission including a pump 20 and a motor 21. Pump 20 includes rotary actuating shaft 22 driving a cylinder block 23 including reciprocal pistons 24 engaging a swash plate device 25. Suitable conduit means (not shown) provide for intake and exhaust of fluid to and from the cylinders in which the pistons 24 reciprocate to supply fluid to other chambers in which pistons 66 reciprocate. Pistons 26 engage a swash plate device 27 which drives a motor output gear 28 meshing with motor pinion gear 29 connected with and rotating a splined output fitting 30 for connection to an output shaft.

Power for operating the transmission is supplied through a power transmission mechanism including a driving member 35. Driving member 35 acts through a quick disconnect device to drive a driven member 36. In the illustrated embodiment the driving member 35 is in the form of a rotating drive shaft and the driven member 36 is in the form of a gear meshed with a pinion gear 37 connected with the pump actuating shaft 22.

The transmission of power from the driving member 35 to the driven member 36 is effected in the illustrated embodiment through a coupler 38.

Cooperating disengageable driven connectors 39 are provided on the coupler 38 and the driven member 36 for driving the driven member responsive to operation of the driving member 35. In order that the quick disconnect device have no running parts when the driving and driven member are disengaged, cooperating, disengageable driving connectors 40 are provided on the coupler 38 and the driving member 35.

With particular reference to FIGURE 1, in the illustrated embodiment the driven member 36 is journalled in a casing frame 41 by suitable bearings 42 for rotation about a longitudinal axis of the quick disconnect device. Coupler 38 normally rotates with the driven member 36 but is journalled in the driven member for rotation about the longitudinal axis by a body portion 43 of the coupler which is telescopically journalled in a through bore 44 of the driven member. The opposite end of the coupler body 43 is telescopically splined on a stub shaft 45 journalled in casing frame 41 for rotation about the longitudinal axis. Thus the coupler 38 is telescopically movable along the longitudinal axis of the quick disconnect device between a driving position as illustrated in FIGURE 1, and a released position in which the coupler is telescoped to the left, as viewed in FIGURE 1.

Driven connectors 39 are illustrated in the preferred embodiment in the form of clutch teeth which are engaged in the driving position, and are disengaged in the released position by movement of the coupler teeth away from driven member teeth and to the left as viewed in FIGURE 1. Driving connectors 40 are illustrated in the preferred embodiment in the form of a detachably telescoped splined connection including a splined socket in an end of the driving member 35 and the end of a mating male spline on the end of a fitting 46 of coupler 38. Fitting 46 is splined and held in a socket in the outer end of coupler 43 for rotary and axial movement with the coupler body.

As the coupler 38 moves from the driving position, illustrated in FIGURE 1, to the released position the driven connector clutch teeth 39 are disengaged so that the transmission of power to the driven member 36, and therefore the pump 20, ceases before the driving connector splines 40 are disengaged. Upon disengagement of the driving connector splines 40, the driving member is free to continue operation while the remainder of the quick disconnect device comes to rest and has no other running parts.

Coupler 38 is urged toward the driving position by resilient means here in the form of nested compression springs 47 having opposite ends seated, respectively, on the base of a socket in body portion 43 of the coupler 38 and the base of a socket in stub shaft 45. As the coupler moves from the released position to the driving position, the driving connector splines 40 engage before the driven connector clutch teeth 39 so that the coupler is placed in rotation before the driven connector teeth are engaged for driving the driven connector 36.

Rapid movement of the quick disconnect device to the released position is effected through a worm gear mechanism. The worm gear includes a worm 48 connected with the coupler 38 for rotation and telescopic movement therewith about the longitudinal axis of the quick disconnect device. In the illustrated embodiment the worm 48 is an integral part of the coupler. The worm gear further includes an idler worm wheel 49 journaled in casing frame 41 for free rotation on an axis transverse to the longitudinal axis. Cooperating meshed teeth on the worm 48 and worm wheel 49 provide for movement of the coupler 38 toward the driving position responsive to rotation of the coupler by the driving member 35 in the intended direction of power transmission. Therefore, by stopping the idling rotation of the worm wheel 49 the worm 48 and coupler 38 are caused to run or thread their way rapidly through the worm wheel thus moving the coupler to the left as viewed in FIGURE 1, and from the driving to the released position. By preventing rotation of the worm wheel and reverse rotation of the worm 48 the coupler is maintained in the released position against the urging of compression springs 47 which act to move the coupler to the driving position.

Means to prevent reverse rotation of worm 48 and partially buffer the force of the coupler moving into the released position are provided by a ratchet mechanism including a plurality of leaf spring arms 50 secured at one end to a collar 51 which is non-rotatably secured to casing frame 41 by bolts which also secure the spring arms to the collar. The spring arms may be best seen in FIGURES 8 and 9. Free ends of spring arms 50 are positioned to be engaged in outer ends of sockets 52 in the adjacent end of coupler 38 in the released position. The force of coupler 38 moving rapidly to the released position is partially absorbed by the spring arms 50, and the ratchet action of the spring arm free ends in the coupler sockets 52 prevents reverse rotation of the worm 48. It should be noted that the power for moving the coupler 38 to the released position is provided by operation of the driving member 35. Whether through normal rotation of the driving member 35 or the force of compression springs 47, the worm 48 always tends to rotate the worm wheel 49 in the same direction, and by holding the worm wheel against such rotation the coupler 38 is maintained in the released position. In order to provide for freer movement between the worm 48 and worm wheel 49 gaps are provided in the worm wheel teeth. As illustrated in FIGURE 3 of the preferred embodiment, a tooth is missing between groups of three consecutive teeth 49a of the worm wheel 49.

Mechanism for controlling rotation of the worm wheel 49 is illustrated in FIGURE 2 in the form of a plunger assembly. An abutment 55 extending outwardly from and rotatable with the worm wheel 49 is positioned to be engaged by one end 56 of a cylindrical main plunger 57 upon movement of the main plunger by a compression spring 57a from a retracted position illustrated in FIGURE 2, to an extended position. Main plunger 57 is telescopically and rotatably mounted in a cylindrical sleeve 58 in main bore of a plunger assembly body provided by the casing frame 41.

Retention of the main plunger 57 in the retracted position is provided by a spring urged holding plunger 59 in a transverse bore in the body and extending through an opening in sleeve 58 and having a free end received in a socket 60 in the main plunger 57. Holding plunger 59 is connected with the core of a solenoid actuating assembly 61 for withdrawing the holding plunger from the socket 60. The solenoid actuating assembly 61 may be of such a nature as to withdraw the holding plunger from the socket either upon energization or deenergization of the solenoid, thereby adapting the quick disconnect device for control as through a manually operable switch, or automatically through connection with a suitable control circuit, and for use as either an emergency measure or as part of a planned program. As the holding plunger 59 is withdrawn from the socket 60 its free end is retained in a cam portion in the side of main plunger 57, and more particularly in a longitudinally extending straight groove 62 in the side of the main plunger for effectively preventing rotational movement of the main plunger as it moves from the retracted to the extended position in engagement with abutment 55 on worm wheel 49. Socket 60 is at the end of groove 62 nearest the end 56 of the stop plunger 57.

A spring pressed detent 63 is telescoped in a second transverse bore in the body. As the main plunger moves to the extended position the outer end of the spring pressed detent which is resiliently urged by a compression spring 64 into engagement with the side of main plunger 57, engages a shoulder 65 facing away from the main plunger end 56 and toward a second end of the main plunger. Shoulder 65 intersects a chordal undercut portion 66 which provides a camming surface on the side of the main plunger. In the extended position the spring pressed detent 63 engages this camming surface.

A T-shaped handle 67, for withdrawing the main plunger 57 from the extended position, has a leg in the form of a rod 67a extending into a longitudinal bore 68 opening through the second end of the main plunger 57 and is received in an inner reduced socket portion of the bore with a snug sliding fit. Rod 67a also extends through and is journalled in a cap 69 secured to the casing frame 41 as by bolts. The handle 67 is urged inwardly toward the casing frame by a compression spring 70 having opposite ends seated, respectively, against an enlarged inner end of the rod 67a and the base of a socket formed in the cap 69. Thus the handle 67 is normally held retracted adjacent the cap 69. Compression spring 57a has opposite ends seated respectively against the base of the socket in cap 69 and a shoulder of the bore in the main plunger 57.

Rod 67a has a transversely extending finger 72 slidably received in a closely fitting longitudinally extending slot 73 opening through the main plunger side and into the main plunger bore for rotating the main plunger. In order to retract the main plunger 57, it is rotated (counterclockwise as viewed in FIGURE 7) by handle 67 so that the cam surface 66 slides across the free end of spring pressed detent 63 to depress the detent and position the end of detent on the cylindrical side of stop plunger 57. With the spring pressed detent 63 disengaged from the shoulder 65, the handle 67 may be pulled outwardly with its finger 72 engaging the end of slot 73 thereby retracting the main plunger. As the main plunger is retracted, the holding plunger 59 continues to ride in the cam portion through a curved channel 74 connecting the opposite ends of the groove 62 until the main plunger 57 is retracted and rotated (clockwise as viewed in FIGURE 7) so that holding pawl 59 is again seated in socket 60 and detent 63 is seated on flat 75.

To very briefly summarize the operation of the preferred embodiment of the power transmission mechanism, with the quick disconnect device in the driving position as illustrated in FIGURE 1, rotation of the driving member or input shaft 35 rotates the coupler 38 and the driven member or gear 36. Worm 48 rotates with the coupler 38 and drives the idler worm wheel 49. By actuating the solenoid control 61, shown in FIGURE 2, main plunger 57 moves to its extended position engaging worm wheel abutment 55 to stop rotation of the worm wheel. Worm 48 then threads itself through the worm wheel moving the coupler 38 to the released position. The ratchet mechanism including spring arms 50 and coupler sockets 52 prevent reverse rotation of the worm, thereby holding the coupler in the released position. As coupler 38 moves to the released position, driven connector clutch teeth 39 disengage before driving connector splines 40. Upon moving main plunger 57 back to its retracted position, by use of handle 67, the worm wheel 49 is free to rotate whereupon compression springs 47 thread the worm 48 back through the worm wheel to move and hold the coupler 38 in the driving position.

I claim:

1. A power transmission mechanism comprising: a driving member; a driven member; a coupler; means mounting said coupler for rotation about an axis and movement along said axis between driving and released positions; first releasable means for connecting said coupler and driving member and connected for rotating said coupler in one direction responsive to operation of said driving member; second releasable means for connecting said coupler and driven member and connected for driving said driven member responsive to rotation of said coupler; said first and second releasable means being associated with each other for disengagement of said driven member prior to disengagement of said driving member and for engagement of said driving member prior to engagement of said driven member; means urging said coupler toward said driving position; a worm gear for moving said coupler from said driving position to said released position, said worm gear including a worm movable with said coupler around and along said axis, and a worm wheel; and means for stopping rotation of said worm wheel to effect movement of said worm and coupler from said driving position to said released position.

2. A power transmission mechanism comprising: a driving member; a driven member; a coupler; means mounting said coupler for rotation about an axis and movement along said axis between driving and released positions; first releasable means for connecting said coupler and driving member and connected for rotating said coupler in one direction responsive to operation of said driving member; second releasable means for connecting said coupler and driven member and connected for driving said driven member responsive to rotation of said coupler, said first and second releasable means being associated with each other for disengagement of said driven member prior to disengagement of said driving member and for engagement of said driving member prior to engagement of said driven member; means urging said coupler toward said driving position; a worm gear including a worm movable with said coupler around and along said axis; means preventing reverse rotation of said worm in said released position; a worm wheel; means mounting said worm wheel for rotation about an axis transverse to the axis of said coupler; meshed teeth on said worm and worm wheel for moving said worm toward said released position responsive to the stopping of rotation of said worm wheel and the continued rotation of said worm in said one direction; means including an abutment on said worm wheel and a main plunger for releasably engaging said abutment for stopping rotation of said worm wheel thereby effecting movement of said worm and coupler from said driving position to said released position; means for holding said main plunger out of engagement with said abutment and for releasing said main plunger for engagement with said abutment; and means for releasably holding said main plunger in engagement with said abutment.

3. A power transmission mechanism comprising: a driving member; a driven member; a coupler; means mounting said coupler for rotation about an axis and movement along said axis between driving and released positions; cooperating driving connectors on said coupler and driving member disengaged in said released position and engaged in said driving position for rotating said coupler in one direction responsive to operation of said driving member; cooperating driven connectors on said coupler and driven member disengaged in said released position and engaged in said driving position for driving said driven member responsive to rotation of said coupler, said driving and driven connectors being associated with said coupler for disengagement of said driven connectors prior to disengagement of said driving connectors and for engagement of said driving connectors prior to engagement of said driven connectors; resilient means urging said coupler toward said driving position; a worm fixed on said coupler concentric with said axis; means preventing reverse rotation of said worm in said released position; a worm wheel; means mounting said worm wheel for rotation about an axis transverse to the axis of said coupler; meshed teeth on said worm and worm wheel for moving said worm toward said released position responsive to the stopping of rotation of said worm wheel and the continued rotation of said worm in said one direction; means including an abutment on said worm wheel and a main plunger for releasably engaging said abutment and stopping rotation of said worm wheel thereby effecting movement of said worm and coupler from said driving position to said released position; means urging said main plunger toward said abutment; means comprising a holding plunger for releasably holding said main plunger out of engagement with said abutment; solenoid means for releasing said holding plunger from engagement with said main plunger; detent means for releasably engaging and effectively holding said main plunger in engagement with said abutment; means responsive to rotation of said main plunger for releasing said detent from holding engagement with said main plunger; and means for rotating said main plunger to release said detent.

4. A power transmission mechanism comprising: a driving shaft; a driven gear; a coupler; means mounting said coupler, said shaft, and said gear for rotation about a common axis and movement of said coupler along said axis between driving and released positions; cooperating splines on said coupler and shaft disengaged in said released position and engaged in said driving position for rotating said coupler in one direction responsive to rotation of said shaft in one direction; cooperating clutch teeth on said coupler and gear disengaged in said released position and engaged in said driving position for driving said driven member responsive to rotation of said coupler, said coupler splines and clutch teeth being associated for disengagement of said cooperating clutch teeth prior to disengagement of said splines and for engagement of said splines prior to engagement of said cooperating clutch teeth; resilient means urging said coupler toward said driving position, a worm fixed on said coupler concentric with said axis; means preventing reverse rotation of said worm in said released position; a worm wheel; means mounting said worm wheel for rotation about an axis transverse to the axis of said coupler; meshed teeth on said worm and worm wheel for moving said worm toward said released position responsive to the stopping of rotation of said worm wheel and the continued rotation of said worm in said one direction; a portion of said worm wheel teeth being eliminated; means including an abutment on said worm wheel and a main plunger for releasably engaging said abutment and stopping rotation of said worm wheel thereby effecting movement of said worm and coupler from said driving position and holding said coupler in said released position; means urging said main plunger toward said abutment; means comprising a holding plunger for releasably holding said main plunger out of engagement with said abutment; solenoid means for releasing said holding plunger from holding engagement with said main plunger; detent means for releasably engaging and effectively holding said main plunger in engagement with said abutment; means responsive to rotation of said main plunger for releasing said detent from holding engagement with said main plunger; and means for rotating said main plunger to release said detent and for then moving said main plunger out of engagement with said abutment.

5. A power transmission mechanism comprising: a driving member; a driven member; a coupler; means mounting said coupler for rotation about an axis and movement along said axis between a driving position engaging said members for driving said driven member upon rotation of said coupler in one direction responsive to operation of said driving member and a released position out of engagement with both of said members; means urging said coupler toward said driving position; a worm gear including a worm connected with said coupler for rotation therewith about said axis and for movement therewith along said axis between said driving and released positions and a worm wheel for moving said worm and coupler toward said released position responsive to the stopping of rotation of said worm wheel and the continued rotation of said worm in said one direction; and means for stopping rotation of said worm wheel to cause said worm and coupler to move from said driving position to said released position.

6. A power transmission mechanism comprising: a driving member; an axially fixed driven member; means coaxially mounting said driving and driven members; a coupler; means mounting said coupler for rotation about the axis of said members and movement along said axis between a driving position engaging said members for driving said driven member upon rotation of said coupler in one direction responsive to operation of said driving member and a released position out of engagement with at least one of said members; means urging said coupler toward said driving position; a worm; means connecting said worm with said coupler for rotation therewith about said axis and for movement therewith along said axis between said driving and released positions; a worm wheel mounted for rotation about an axis transverse to the first said axis; meshed teeth on said worm and worm wheel for moving said worm toward said released position responsive to the stopping of rotation of said worm wheel and the continued rotation of said worm in said one direction; and means for stopping rotation of said worm wheel to cause said worm and coupler to move from said driving position to said released position.

7. A quick disconnect device comprising: a coupler; means mounting said coupler for rotation about an axis and movement along said axis between driving and released positions; means urging said coupler toward said driving position; means comprising a worm gear including a worm movable with said coupler around and along said axis; and a worm wheel for moving said coupler toward said released position responsive to rotation of said worm wheel by rotation of said worm in one direction; means preventing reverse rotation of said worm in said released position; means including an abutment on said worm wheel and a main plunger for releasably engaging said abutment and stopping rotation of said worm wheel thereby effecting movement of said worm and coupler from said driving position to said released position; means urging said main plunger toward said abutment; means comprising a holding plunger for releasably holding said main plunger out of engagement with said abutment; solenoid means for releasing said holding plunger from holding engagement with said main plunger; detent means for releasably engaging and effectively holding said main plunger in engagement with said abutment; means responsive to rotation of said main plunger for releasing said detent from holding engagement with said main plunger; and means for rotating said main plunger to release said detent.

8. A plunger assembly comprising: a body having a main bore and a pair of bores transverse to and opening into said main bore; a main plunger telescopically and rotatably mounted in said main bore for movement between an extended position extending outwardly of said body and a retracted position; resilient means urging said main plunger toward said extended position; a holding plunger telescoped in one of said body transverse bores and normally releasably engaging and holding said main plunger in said retracted position; means including a solenoid to release said holding plunger from engagement with said main plunger for movement of said main plunger to said extended position; a detent telescoped in a second of said body transverse bores and resiliently urged into engagement with said main plunger for effectively and releasably holding said main plunger in said extended position; means including a rod telescoped in said main plunger and having an end extending outwardly from said main plunger second end to release said detent from holding engagement with said main plunger and to move said main plunger from said extended position to said retracted position; and resilient means urging said rod into said main plunger.

9. A plunger assembly comprising: a body having a main bore and a pair of bores transverse to and opening into said main bore; a generally cylindrical main plunger having first and second ends and a side, said plunger being telescopically and rotatably mounted in said main bore for movement along the longitudinal axis of said plunger between an extended position with said first end extending outwardly of said body and a retracted position, said side having a longitudinally extending groove with opposite ends, a socket opening into said groove at the groove end nearest said plunger first end, a channel connecting said groove ends, a generally chordal undercut surface and a transverse shoulder intersect said surface and facing away from said plunger first end, a longitudinally extending bore opening through said plunger second end, and a longitudinally extending slot opening through said side and into said main plunger bore; resilient means in said main bore urging said main plunger toward said extended position; a holding plunger telescoped in one of said body transverse bores and normally received in said plunger groove and socket for holding said main plunger in said retracted position; means including a solenoid to withdraw said holding plunger from said socket and to retain said holding plunger in said groove for movement of said main plunger to said extended position while effectively preventing rotation of said main plunger; a detent telescoped in a second of said body transverse bores and resiliently urged into engagement with said main plunger side and engaging said shoulder when said main plunger is in the extended position for effectively and releasably holding said main plunger in said extended position; a rod telescoped in said main plunger bore and having an end extending outwardly from said main plunger second end; a finger extending transversely from said rod and received in said slot for retaining said rod in said slot and effectively preventing rotation between said main plunger and said rod, whereby when said main plunger is in said extended position rotation of said rod rotates said main plunger to move said surface across said detent and release said detent from said shoulder whereupon said rod is effective to move said main plunger to said retracted position with said holding plunger riding in said channel; and reslient means urging said rod into said bore.

10. A plunger assembly comprising: a body; a main plunger telescopically and rotatably mounted in said body for movement between an extended position and a retracted position; means urging said main plunger toward said extended position; a holding plunger mounted on said body and normally releasably holding said main plunger in said retracted position; means to release said holding plunger for movement of said main plunger to said extended position; a detent retractably mounted on said body for effectively and releasably holding said main plunger in said extended position; release means on said main plunger; means for rotating said main plunger to move said main plunger release means into engagement with said detent to retract the detent and free said main plunger for movement from said extended position to said retracted position.

11. A power transmission mechanism comprising: a driving member; a driven member; means coaxially mounting said driving and driven members; a coupler having means for drivingly engaging said driving and driven members; means mounting said coupler for rotation about the axis of said members and movement along said axis between a driving position wherein said coupler means drivingly engages said members for driving said driven member upon rotation of said coupler in one direction responsive to operation of said driving member, and a released position wherein said coupler means is out of engagement with both of said members; return means urging said coupler toward said driving position; means actionable for moving said coupler toward said released position responsive to rotation of said coupler in said one direction by said driving member; said last named means moving said coupler means out of engagement with said driven member before moving said coupler means out of engagement with said driving member as said coupler is moved into the released position, and said return means moving said coupler means into engagement with said driving member before moving said coupler means into engagement with said driven member as said coupler is moved into the driving position.

12. A power transmission mechanism comprising: a driving member; a driven member; a coupler having a first means for engaging said driving member and a second means for engaging said driven member; means mounting said coupler for rotation about an axis and movement along said axis between a driving position wherein said coupler first means engages said driving member, and said coupler second means engages said driven member to drive said driven member upon rotation of said coupler in one direction responsive to operation of said driving member, and a released position wherein said coupler first means is out of engagement with said driving member and said coupler second means is out of engagement with said driven member; return means urging said coupler toward said driving position; and disconnect means for rotating said coupler and for moving said coupler longitudinally between said driving and released positions to move said coupler second means out of engagement with said driven member before moving said coupler first means out of engagement with said driving member as said coupler is moved into the released position, said return means moving said coupler first means into engagement with said driving member before moving said coupler second means into engagement with said driven member as said coupler is moved into the driving position.

13. A power transmission mechanism as defined in claim 12 wherein said disconnect means includes a worm connected with said coupler for rotation therewith about said axis and for movement therewith along said axis between said driving and released positions, a worm wheel for moving said worm and coupler toward said released position responsive to the stopping of rotation of said worm wheel and the continued rotation of said worm in said one direction; and means for stopping rotation of said worm wheel to cause said worm wheel and coupler to move from said driving position to said released position.

References Cited by the Examiner
UNITED STATES PATENTS

| | | | |
|---|---|---|---|
| 504,262 | 8/93 | Adams | 292—150 |
| 1,440,610 | 1/23 | Kupetz | 192—150 |
| 2,509,813 | 5/50 | Dineen | 192—101 |
| 2,547,108 | 4/51 | Anderson | 292—150 |
| 2,593,365 | 4/52 | Thull | 74—527 |
| 2,802,555 | 8/57 | Kalikow | 192—24 |
| 2,808,139 | 10/57 | Bowers | 192—139 |
| 2,845,805 | 8/58 | Crewe | 74—169 |

DAVID J. WILLIAMOWSKY, *Primary Examiner.*

THOMAS J. HICKEY, *Examiner.*